United States Patent [19]
Ito et al.

[11] Patent Number: 5,095,474
[45] Date of Patent: Mar. 10, 1992

[54] ACCESSING APPARATUS FOR OPTICAL INFORMATION RECORDING AND REPRODUCING APPARATUS

[75] Inventors: Kenichi Ito; Hiroyuki Hagita, both of Hachioji; Kenji Ichimura, Chofu, all of Japan

[73] Assignee: Olympus Optical Co., Ltd., Tokyo, Japan

[21] Appl. No.: 592,432

[22] Filed: Oct. 4, 1990

[30] Foreign Application Priority Data

Oct. 11, 1989 [JP] Japan ................................ 1-265922
Apr. 19, 1990 [JP] Japan ................................ 2-103982

[51] Int. Cl.⁵ ............................................. G11B 7/00
[52] U.S. Cl. .............................................. 369/44.25
[58] Field of Search ............. 369/32, 43, 44.11, 44.25, 369/44.27, 44.28, 44.29, 44.35, 48, 56, 57

[56] References Cited

U.S. PATENT DOCUMENTS 4,745,587  5/1988  Maeda ........................... 369/32 X
4,764,911  8/1988  Morota et al. ................. 369/32 X
4,835,752  5/1989  Nakatsu et al. ............... 369/32 X
4,931,889  6/1990  Osafune ......................... 369/32 X
4,955,009  9/1990  Nakatsu et al. ............... 369/32 X

FOREIGN PATENT DOCUMENTS 58-91536  5/1983  Japan .

Primary Examiner—Robert L. Richardson
Attorney, Agent, or Firm—Armstrong, Nikaido, Marmelstein, Kubovcik & Murray

[57] ABSTRACT

The accessing apparatus, which is to be used for an optical information recording and reproducing apparatus, controls the speed of a light spot and accesses the light spot to an object track. The apparatus includes a speed instructing device for outputting a speed instructing signal instructing the moving speed of the light spot when accessing the light spot to the object track. A track error signal detecting device detects a track error signal showing a position difference between the light spot and the track. A speed detecting device detects a speed detecting signal showing the relative speed between the light spot and the track by using the track error signal. An operating device operates the speed error signal based on the speed instructing signal and speed detecting signal. A driving device moves the light spot for the track based on the speed error signal to access the light spot to the object track by controlling the speed of the light spot. A regulating device regulates the signal from the speed detecting device to the driving device so that the speed detecting signal exceeding a predetermined range may not be used for speed control of the light spot by the driving device.

12 Claims, 7 Drawing Sheets

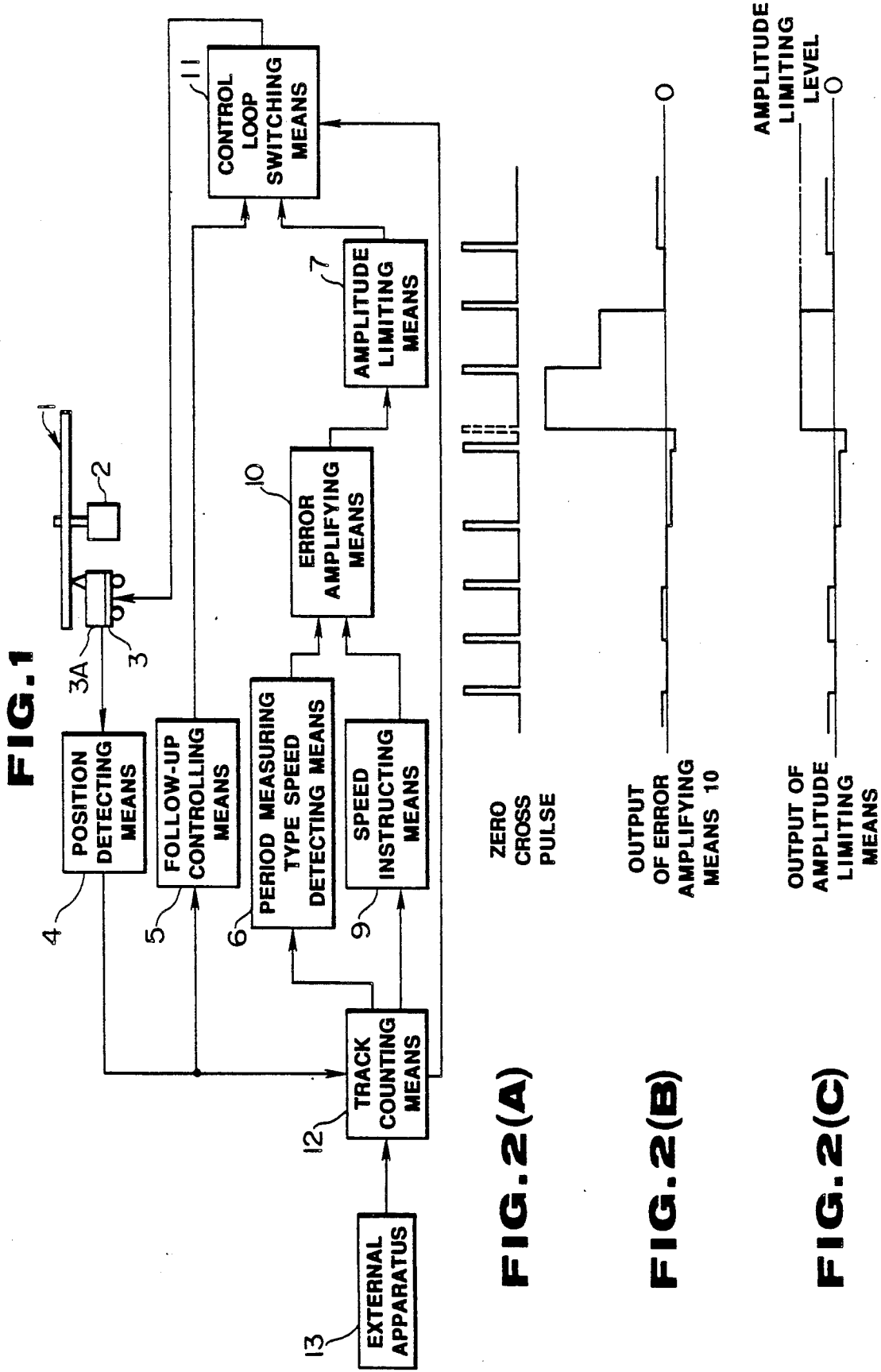

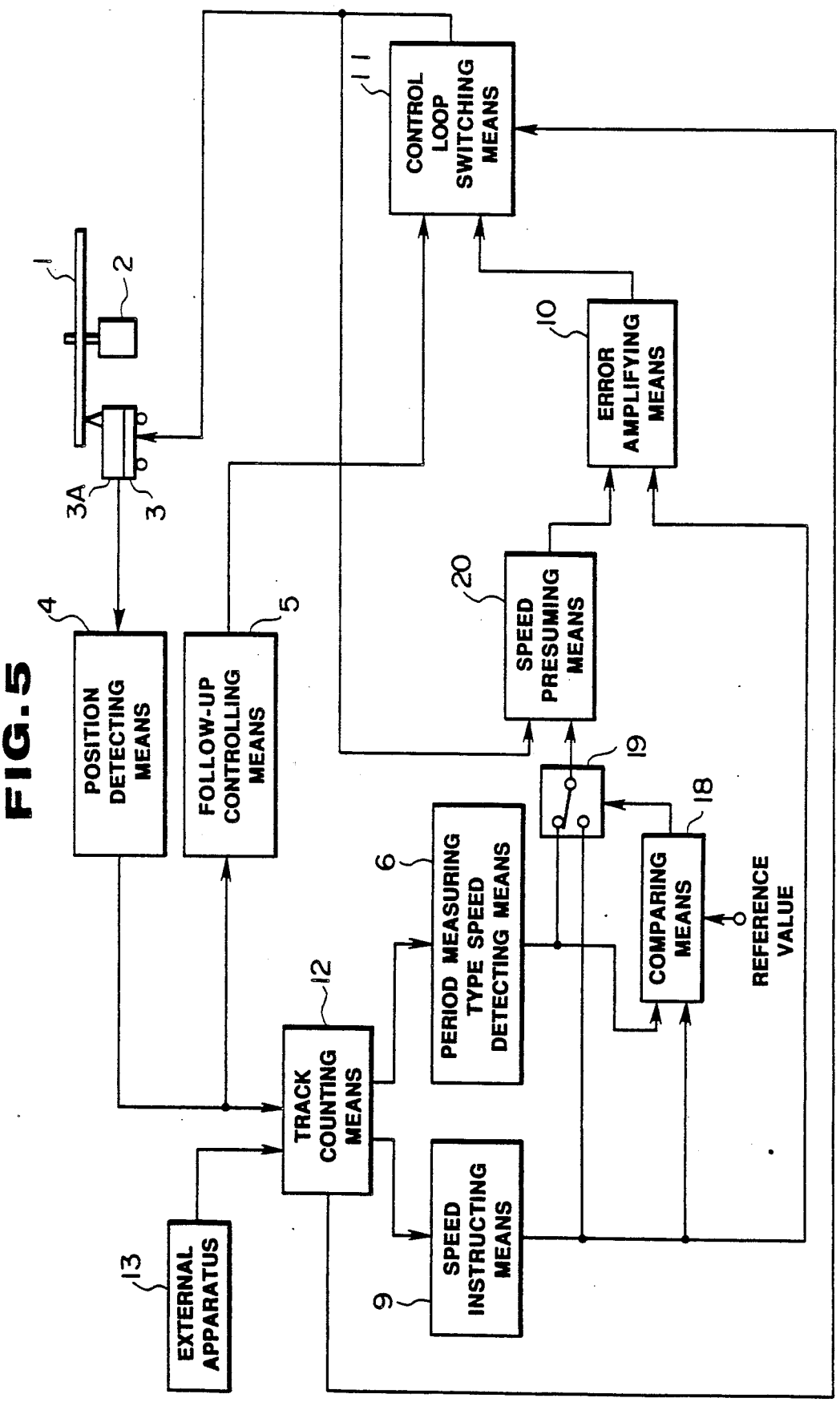

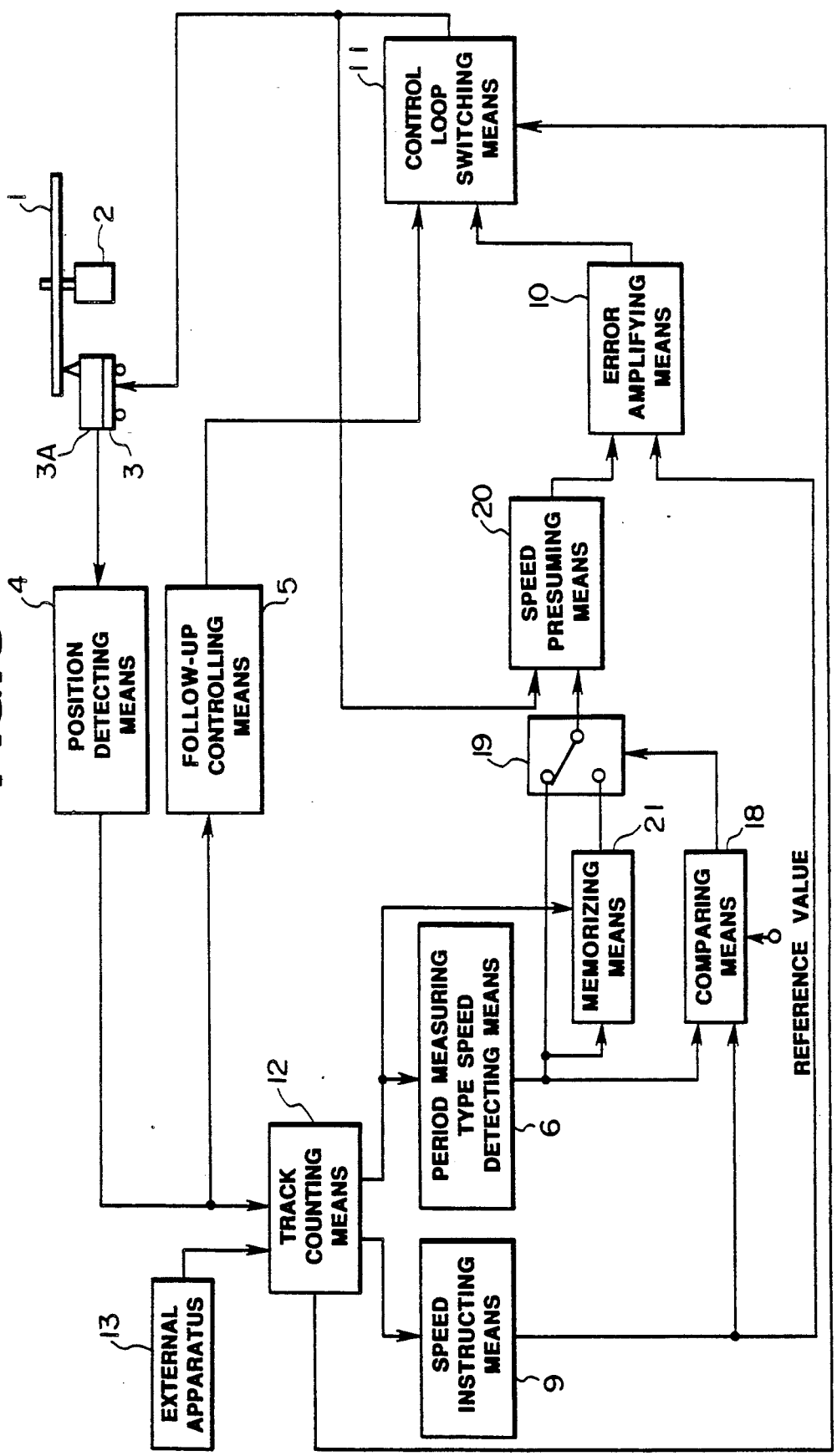

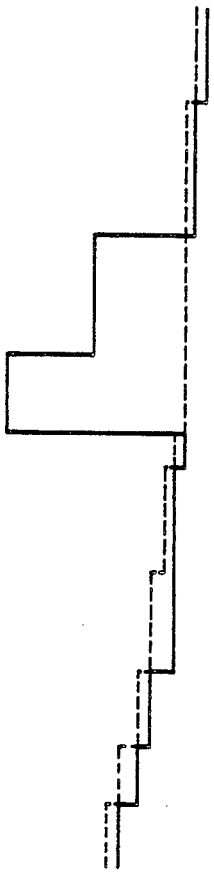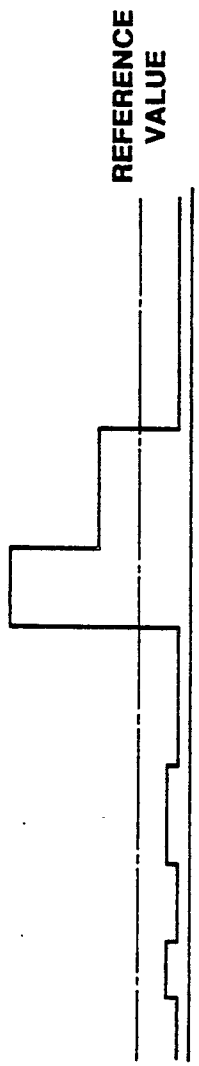
FIG. 7(A) ZERO CROSS PULSE
FIG. 7(B) OUTPUT OF SPEED DETECTING MEANS 6
FIG. 7(C) DIFFERENCE BETWEEN OUTPUT OF SPEED DETECTING MEANS 6 AND OUTPUT OF SPEED INSTRUCTING MEANS 9
REFERENCE VALUE
FIG. 7(D) OUTPUT OF SIGNAL SWITCHING MEANS 19

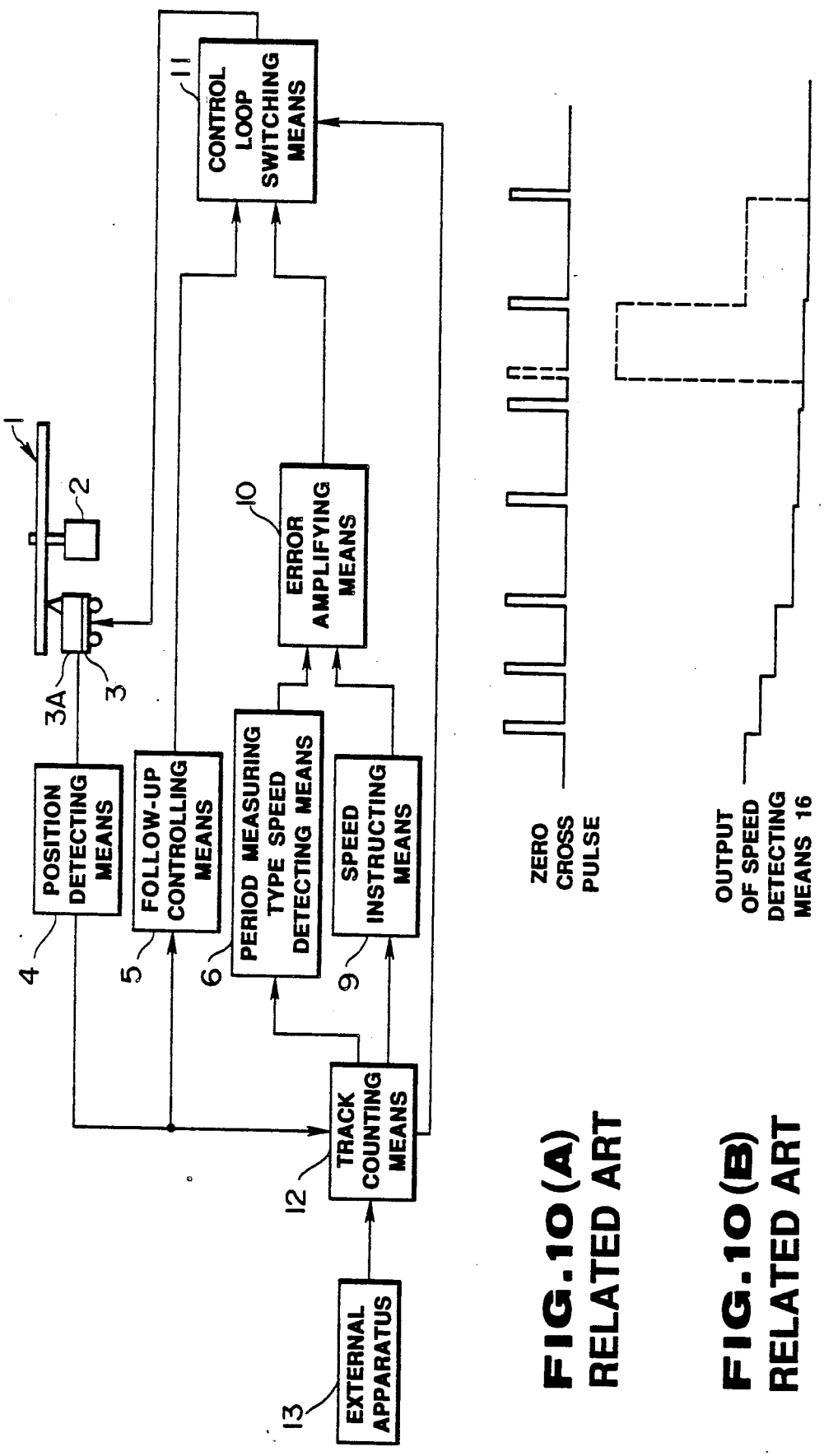

ACCESSING APPARATUS FOR OPTICAL INFORMATION RECORDING AND REPRODUCING APPARATUS

BACKGROUND OF THE INVENTION

2. Field of the Invention

This invention relates to an accessing apparatus which is to be used for an optical information recording and reproducing apparatus doing at least one of recording and reproducing information in an optical recording medium and is to position a light spot on an object track in an optical recording medium.

2. Related Art Statement

Recently, with the development of the information industry, optical information recording and reproducing apparatus such as an optical disk apparatus has come to be noted as a large capacity memorizing (storing) apparatus. In such an optical disc apparatus, as an access system of positioning a light spot on an object track in an optical disk, as shown in the publication, for example, of a Japanese patent application laid open No. 91536/1983, there is a system of counting signals when a track in an optical disk is crossed.

An example of an accessing apparatus of an optical disk is shown in FIG. 9. This apparatus has an optical head 3A recording or reproducing information by forming a light spot by projecting a radiated light on an information track provided on an optical disk as opposed to the optical disk 1 rotated and driven by a spindle motor 2. This optical head 3A is mounted on a positioning means 3 and is moved in the radial direction of the optical disk 1 by this positioning means 3. A tracking error signal showing the position displacement of the light spot on the optical disk 1 is made by a position detecting means 4 connected to the optical head 3A. This error signal is input into a follow-up controlling means 5 and track counting circuit 12. The follow-up controlling means 5 feeds back its output to the positioning means 3 through a controlling loop switching means 11 and forms a follow-up controlling loop so that the optical head 3A may follow any desired track in response to the tracking error signal. In the track counting means 12, the number of tracks to be run will be input from an external apparatus in case the optical head 3A accesses to any desired track. Whenever the optical head 3A crosses the track, the track counting means 12 will reduce the input value. The output of this track counting means 12 is input into a period measuring type speed detecting means 6 and speed instructing means 9. The period measuring type speed detecting means 6 detects the moving speed of the positioning means 3 by measuring the period of crossing the track. The speed instructing means 9 instructs the moving speed of the positioning means 3 in response to the contents of the track counter showing the number of tracks to the momentary object within the track counting means 12. By the error amplifying means 10, the error output of the period measuring type speed detecting means 6 and speed instructing means 9 is amplified, the output is fed back to the positioning means 3 through the controlling loop switching means 11 and a speed controlling loop is formed. The follow-up controlling loop and speed controlling loop are switched with each other by inputting the timing signal into the controlling loop switching means 11 after the contents of the track counter become zero by the track counting means 12.

By the above optical disk accessing apparatus, the speed is controlled according to the optimum speed curve instructed by the speed instructing means 9 to the object track, the loop is switched to the follow-up controlling loop near the object track and the object track is entered to complete the accessing operation.

However, with such a formation as in FIG. 9, as shown in FIG. 10(A), in case noise, as is shown by the broken line, mixes into the zero crossing pulse (track crossing pulse) of the tracking error signal to be the input of the period measuring type speed detecting means 6, the pulse period will be made so short by this noise that, as shown in FIG. 10(B), the output of the speed detecting means 6 will greatly fluctuate to the large speed side as shown by the broken line. As a result, the positioning means 3 will be temporarily greatly decelerated, will move in the reverse direction in the extreme case and will deviate from the speed profile to be inherently followed and the object track will not be able to be reached. Since noise is generated, for example, by the flaw of the disk 1, in order to prevent such a defect, a countermeasure as selecting the disk 1 is necessary. No countermeasure can be taken against the flaw generated during the use.

OBJECT AND SUMMARY OF THE INVENTION

An object of the present invention is to provide an accessing apparatus which is to be used for optical information recording and reproducing apparatus and can make a stable accessing operation even in case a pulse generated by a flaw or the like of an optical recording medium mixes into a track crossing pulse.

The accessing apparatus of the present invention which is to be used for optical information recording and reproducing apparatus doing at least one of recording and reproducing information in an optical recording medium, controls the speed of a light spot for a track on the optical recording medium and accesses the light spot to the object track on the optical recording medium comprises:

a speed instructing device for outputting a speed instructing signal showing the moving speed of the light spot for the track when accessing the light spot on the object track of the optical recording medium;

a track error signal detecting device for detecting a track error signal showing a position difference between the light spot and the track;

a speed detecting device for detecting a speed detecting signal showing the relative speed between the light spot and the track by using the track error signal;

a speed error operating device for operating the speed error signal based on the speed instructing signal and the speed detecting signal;

a driving device for moving the light spot for the track based on speed error signal to access the light spot on the object track by controlling the speed of the light spot; and a regulating device for regulating the signal from the speed detecting device to the driving means so that the speed detecting signal exceeding a predetermined range may not be used for the speed control of the light spot by the driving means.

The other features and advantages of the present invention will become apparent with the following explanation.

BRIEF DESCRIPTION OF THE DRAWINGS

FIGS. 1 and 2(A)-2(C) relate to the first embodiment of the present invention.

FIG. 1 is a block diagram showing an accessing apparatus.

FIGS. 2(A)-2(C) are waveform diagrams for explaining the operation of this embodiment.

FIG. 3 is a block diagram showing an essential part of an accessing apparatus.

FIGS. 4(A)-4(B) are waveform diagrams for explaining the operation of this embodiment.

FIG. 5 is a block diagram showing an accessing apparatus of the third embodiment of the present invention.

FIGS. 6 and 7(A)-7(D) relate to the fourth embodiment of the present invention.

FIG. 6 is a block diagram showing an essential part of an accessing apparatus.

FIGS. 7(A)-7(D) are waveform diagrams for explaining the operation of this embodiment.

FIG. 9 is a block diagram showing an accessing apparatus of a related art example.

FIGS. 10(A)-10(B) are waveform diagrams for explaining the operation when a noise mixed in with the apparatus.

DETAILED DESCRIPTION OF THE PREFERRED EMBODIMENTS

Figure 3:
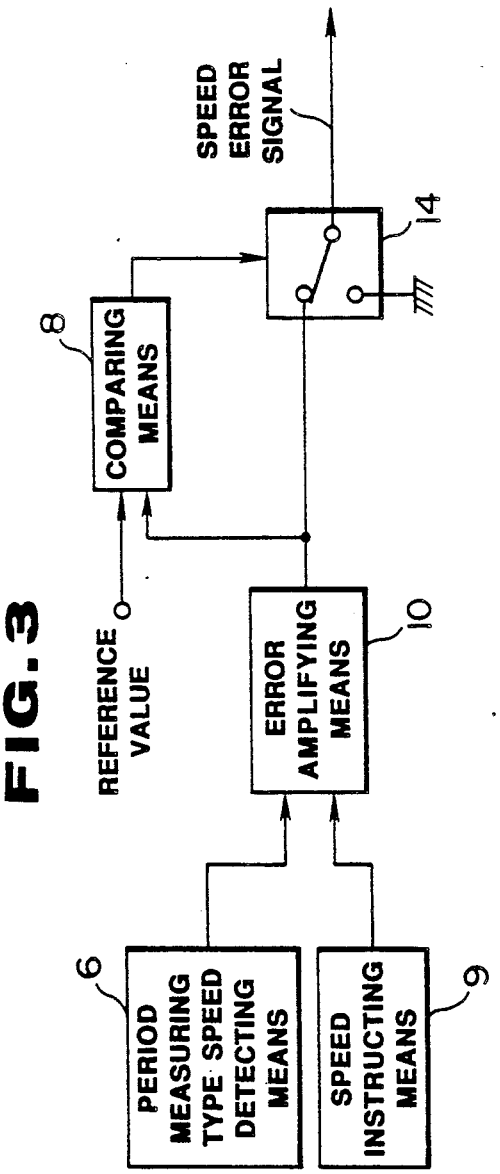
FIGS. 3 and 4(A)-4(B) relate to the second embodiment of the present invention.

FIGS. 1 and 2(A)-2(C) show the first embodiment of the present invention.

As shown in FIG. 1, an accessing apparatus to be used for an optical disk driving apparatus as an optical information recording and reproducing apparatus has an optical head 3A, radiating a light spot for recording and reproducing information on an information track provided on an optical disk 1, opposed to the light disk 1 as an optical recording medium rotated and driven by a spindle motor 2. This optical head 3A is mounted on a positioning device 3 for moving the light spot in the radial direction of the optical disk 1. A position detecting device 4 is connected to the optical head 3A and is to make a tracking error signal showing the position displacement of the light spot on the optical disk 1 from the reflected light detecting output from the optical disk 1 of the optical head 3A. (Since a system such as a push-pull method is known for this position detection, detailed formation shall be omitted.) This tracking error signal is input into the follow-up controlling device 5 and track counting device 12. The follow-up controlling device 5 feeds back its output to the positioning device 3 through a controlling loop switching means 11 and forms a follow-up controlling loop so that the optical head 3A may follow a desired track in response to the tracking error signal.

On the other hand, the number of tracks to cross in case the optical head 3A accesses to a desired track is input into the track counting device 12 from an external apparatus 13. This track counting device 12 will reduce the value input from the external apparatus whenever the optical head 3A crosses the track. The output of this track counting device 12 is input into the period measuring type speed detecting device 6 and speed instructing device 9. The period measuring type speed detecting device 6 detects the moving speed of the positioning device 3 by measuring the period of crossing the track. The speed instructing device 9 instructs the moving speed of the positioning device 3 in response to the contents of the track counter showing the number of tracks to the momentary object.

The respective outputs of the period measuring type speed detecting device 6 and speed instructing device 9 are input into an error amplifying device 10 by which the error outputs of the period measuring type speed detecting device 6 and speed instructing device 9 are amplified. The output of the error amplifying device 10 is input into an amplitude limiting device 7 as a regulating device. This amplitude limiting device 7 consists, for example, of a clipping circuit so as to limit the input signal to be below a predetermined amplitude limiting level. That is, when a signal above the amplitude limiting level is input, a signal of the amplitude limiting level will be output. The output of the amplitude limiting device 7 is fed back to the positioning means 3 through a controlling loop switching means 11 to form a speed controlling loop.

The follow-up controlling loop and speed controlling loop are switched with each other by this controlling loop switching means 11 by inputting the timing signal into the controlling loop switching means 11 after the contents of the track counter become zero by the track counting means 12.

The operation of this embodiment shall be explained in the following.

In case the optical head 3A accesses to a desired track, the number of tracks to cross will be input from the external apparatus 13 into the track counting means 12 which will reduce the value input from the external apparatus 13 whenever the optical head 3A crosses the track, based on the tracking error signal from the position detecting means 4. The moving speed of the positioning means 3 is detected by measuring the period when the light spot crosses the track by the period measuring type speed detecting means 6 based on the output of this track counting means 12. A zero cross pulse of a tracking error signal to be an input of the period measuring type speed detecting means 6 is shown in FIG. 2(A). This zero cross pulse will be generated when the light spot crosses the track. The period measuring type speed detecting means 6 detects the moving speed of the positioning means 3, that is, the moving speed of the light spot by measuring the period of the zero cross pulse. The error outputs of the period measuring type speed detecting means 6 and speed instructing means 9 are amplified by the error amplifying means 10 and are fed back to the positioning means 3 through the amplitude limiting device 7 and controlling loop switching means 11 and the positioning means 3 is driven by the speed control.

By the above operation, the speed is controlled according to the optimum speed curve instructed by the speed instructing means 9 to the object track. After the contents of the track counter of the track counting means 12 become zero, that is, after the light spot reaches the vicinity of the track, a timing signal is input into the controlling loop switching means 11 from the track counting means 12, the follow-up controlling loop is switched on by this controlling loop switching means 11, the object track is entered and the accessing operation is completed.

Here, as shown by the broken line in FIG. 2(A), when a pulse not related with the track crossing timing mixes in, the output of the period measuring type speed detecting means 6 will fluctuate. As a result, as shown in FIG. 2(B), the output of the error amplifying device 10 will also greatly fluctuate. Usually, as the speed instructing signal and the speed detecting signal are made substantially equal to each other by the speed controlling loop, the error signal will be substantially near to zero but will greatly deviate from zero as shown in the drawing when an abnormal pulse mixes in. When this signal is input into the amplitude limiting device 7, its output will be usually equal to the input but will be limited to a predetermined amplitude limiting level when the error signal becomes abnormally large as shown in FIG. 2(C). Thereby, even when an abnormal pulse generated by a flaw or the like of the optical disk 1 mixes into the track crossing pulse, the fluctuation of the signal input into the positioning means 3 will be comparatively small, therefore the speed of the positioning means 3 will be prevented from quickly changing and a stable accessing operation will be possible.

Figure 4A:
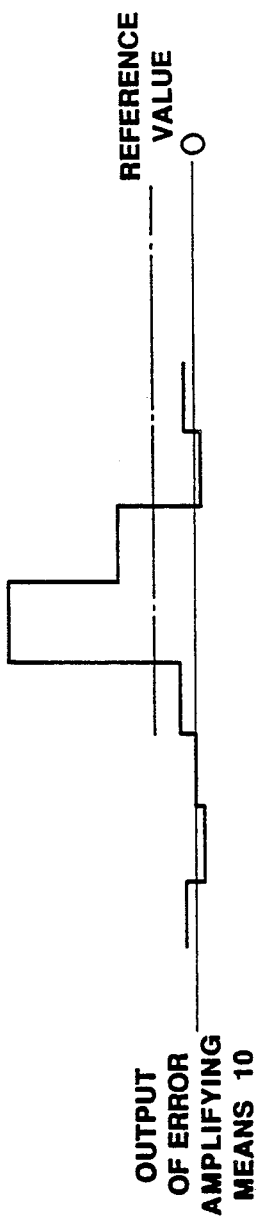
Figure 4B:
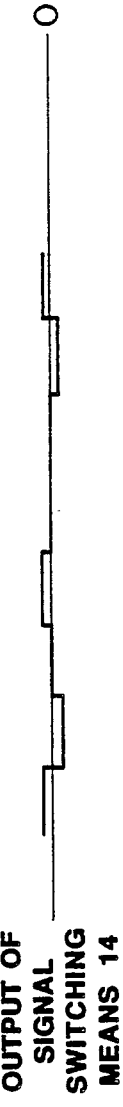

FIGS. 3 and 4(A)-(B) show the second embodiment of the present invention.

The accessing apparatus of this embodiment is different from the first embodiment in the part of the period measuring type speed detecting means 6, speed instructing means 9, error amplifying device 10 and amplitude limiting device 7. The formation of this embodiment corresponding to this part is shown in FIG. 3.

In this embodiment, the output of the error amplifying circuit 10 is input into a comparing device 8 and is applied to one input end of a switching switch of two inputs and one output forming a signal switching device 14. The other input end of the switching switch is grounded. The output of this switching switch is input as a speed error signal into the controlling loop switching means 11. The comparing means 8 compares the output of the error amplifying means 10 with a reference value. When the output of the error amplifying means 10 is larger than the reference value, the input of the switching switch of the signal switching means 14 will be switched to the ground side from the error amplifying means 10 side. Usually the input of the switching switch of the signal switching means 14 is on the error amplifying means 10 side.

As shown in FIG. 4(A), when an abnormal pulse mixes in, the output of the error amplifying means 10 will greatly fluctuate. In the period when the output of this error amplifying means 10 is larger than the reference value, the switch of the signal switching means 14 will be switched by the comparing means 8. As a result, as shown in FIG. 4(B), zero will be output from the signal switching means 14.

Compared with the first embodiment, the output of the error amplifying means 10 is so unusually large that, in the period of interpolating that part, the signal input into the positioning means 3 will be exactly zero. Therefore, there is an effect that the speed variation of the positioning means 3 will become smaller.

The other formations, operations and effects are the same as in the first embodiment.

FIG. 5 shows the third embodiment of the present invention.

In this embodiment, the output of the period measuring type speed detecting means 6 is input into the comparing means 18 and is applied to one input end of a switching switch of two inputs and one output forming a signal switching means 19. The output of the speed instructing means 9 is input into said comparing means 18 and error amplifying means 10 and is applied to the other input end of the switching switch of the signal switching means 19. The comparing means 18 compares the output of the period measuring type speed detecting means 6 and the output of the speed instructing means 9 with each other. In case the difference is larger than the reference value, the input of the switching switch of said signal switching means 19 will be switched to the speed instructing means 9 side from the period measuring type speed detecting means 6 side. Usually the input of the switching switch of the signal switching means 19 is on the period measuring type speed detecting means 6 side.

The output of said signal switching means 19 is input into a speed presuming device 20 into which is also input a signal output from the controlling loop switching device 11 and driving the positioning means 3. This speed presuming means 20 presumes the moving speed of the positioning means 3 by synthesizing the output (usually the output of the period measuring type speed detecting means 6) of said signal switching means 19 and the signal driving the positioning means 3. This system is mentioned, for example, on pages 191-197 of "Optical Memory Symposium, 1986". The output of the speed presuming means 20 and output of the speed instructing device 9 are input into the error amplifying means 10, the error output of both signals is amplified and the output of this error amplifying means 10 is input into the controlling loop switching means 11.

The other formations are the same as in the first embodiment.

The operation of this embodiment shall be explained in the following.

In the usual state, by synthesizing the output of the period measuring type speed detecting means 6 detecting the moving speed of the positioning means 3 by measuring the period when the light spot crosses the track and the signal driving the positioning means 3 by the speed presuming means 20, the moving speed of the positioning means 3 is presumed. By the error output of this presumed speed signal and the speed instructing signal from the speed instructing means 9, the positioning means 3 is driven.

On the other hand, in case the difference between the output of the period measuring type speed detecting means 6 and the output of the speed instructing means becomes larger than the reference value due to the mixing in of an abnormal pulse, the input of the switching switch of the signal switching means 19 will be switched to the output of the speed instructing means 9 from the output of the period measuring type speed detecting means 6. As a result, by synthesizing the output of the speed instructing means and the signal driving the positioning means 3, the moving speed of the positioning means 3 is presumed.

Generally, the speed presuming means 20 is formed so that the low frequency component of the synthesized speed may be close to the output of the period measuring type speed detecting means 6 and the high frequency component may be close to the presumed value by the driving signal of the positioning means 3. Therefore, as in this embodiment, by replacing the output of the period measuring type speed detecting means 6 with the speed instructing signal in the period of the fluctuation of the speed detected value generated by a false pulse, there are effects that there is substantially no influence of the fluctuation of the speed detected value and the speed change generated actually in the positioning means 3 can be well detected.

The other operations and effects are the same as in the first embodiment.

FIGS. 6 and 7(A)–7(D) show the fourth embodiment of the present invention.

The accessing apparatus of this embodiment is different from the third embodiment in the formation from the period measuring type speed detecting means 6 and the speed instructing means 9 to the speed presuming means 20.

As shown in FIG. 6, in this embodiment, the output of the period measuring type speed detecting means 6 in the third embodiment is input into the comparing device 18 and a storing device 21 memorizing the speed data one period before and is applied to one input end of the switching switch of two inputs and one output forming the signal switching means 19. The output of the memorizing device 21 is applied to the other input end of the switching switch of the signal switching means 19. Also, the output of the speed instructing means 9 is input into the comparing means 18 and error amplifying device 10.

The comparing means 18 compares the output of the period measuring type speed detecting means 6 and the output of the speed instructing means 9 with each other and, in case the difference becomes larger than the reference value, the input of the switching switch of the signal switching means 19 will be switched to the memorizing means 21 side from the period measuring type speed detecting means 6 side. Usually the input of the switching switch of the signal switching device 19 is on the period measuring type speed detecting device 6 side.

Also, the memorizing device 21 is updated by a zero cross pulse output from the track counting means 12.

The same as in the third embodiment, the output of the signal switching means 19 and the signal output from the controlling loop switching means 11 and driving the positioning means 3 are input into the speed presuming means 20.

The other formations are the same as in the third embodiment.

The operation of this embodiment shall be explained in the following with reference to FIGS. 7(A)–7(D).

As shown by the broken line in FIG. 7(A), when a pulse not related with the track crossing timing mixes into the zero cross pulse, the output of the period measuring type speed detecting means 6 will greatly fluctuate as shown by the solid line in FIG. 7(B). Usually, as the speed instructing signal and the speed detecting signal are made substantially equal to each other by the speed controlling loop, their difference will be substantially near zero.

On the other hand, as shown in FIG. 7(C), in case the difference between the output of the period measuring type speed detecting means 6 and the output of the speed instructing means 9 becomes larger than the reference value as an abnormal pulse mixes in, the input of the switching switch of the signal switching means 19 will be switched to such output of the memorizing device 19 as is shown by the broken line in FIG. 7(B) from the output of the period measuring type speed detecting means 6. As a result, by synthesizing the output of the signal switching means 19 as is shown in FIG. 7(D) and the signal driving the positioning means 3, the moving speed of the positioning means 3 is presumed.

As described in the third embodiment, generally the speed presuming means 20 is formed so that the low frequency component of the synthesized speed may be close to the output of the period measuring type speed detecting means 6 and the high frequency component may be close to the presumed value by the driving signal of the positioning means 3. Therefore, as in this embodiment, by replacing the output of the period measuring type speed detecting means 6 with the speed data one period before in the period of the fluctuation of the speed detected value generated by a false pulse, there are effects that there is substantially no influence of the fluctuation of the speed detected value and the speed change generated actually in the positioning means 3 can be well detected.

The other operations and effects are the same as in the third embodiment.

Figure 8:
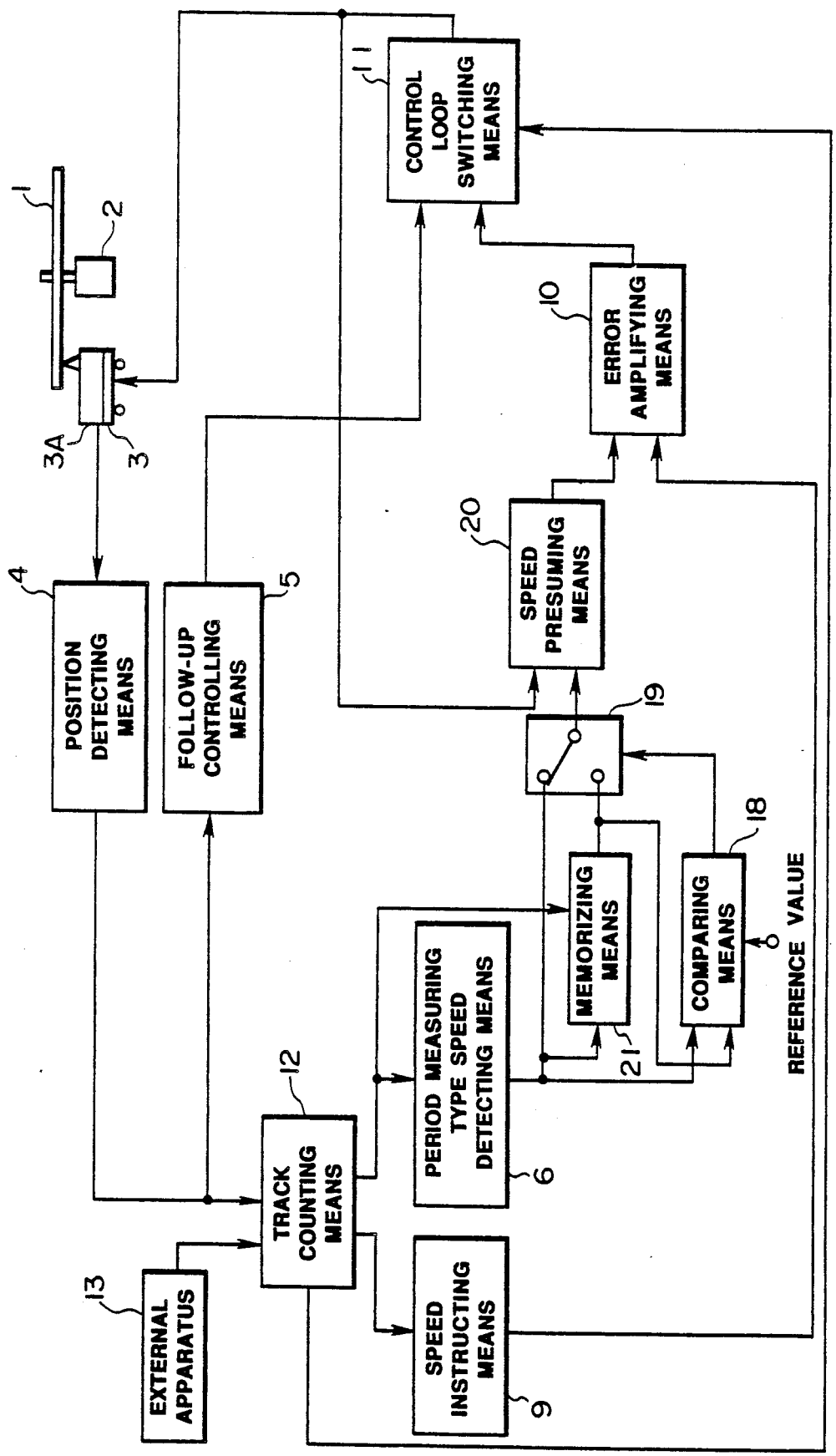
FIG. 8 is a block diagram showing an accessing apparatus of the fifth embodiment of the present invention.

FIG. 8 shows the fifth embodiment of the present invention.

The accessing apparatus of this embodiment is different from the fourth embodiment in the part of the speed instructing means 9, comparing means 18 and memorizing device 21 in FIG. 6.

That is to say, in this embodiment, the output of the speed instructing means 9 is input only into the error amplifying means 10. The output of the memorizing means 21 is applied to one input end of the switching switch of two inputs and one output forming the signal switching means 19 and is input into the comparing means 18.

The operation of this embodiment shall be explained in the following.

The comparing means 18 compares the output of the period measuring type speed detecting means 6 and the output of the memorizing device 21 with each other and, in case the difference becomes larger than the reference value, the input of the switching switch of the signal switching means 19 will be switched to the memorizing device 21 side from the period measuring type speed detecting means 6 side. Usually the input of the switching switch of the signal switching means 19 is on the period measuring type speed detecting means 6 side.

As understood from FIG. 7(B), when a pulse not related with the track crossing timing mixes in, the output of the period measuring type speed detecting means 6 will fluctuate so quickly and greatly that the difference between the present output of the period measuring type speed detecting means 6 and the output just before will become large. Therefore, in this embodiment, in case the difference between the present output of the period measuring type speed detecting means 6 and the output just before becomes large, the output of the period measuring type speed detecting means 6 will be replaced with the speed data one period before.

In case the difference between the present output of the period measuring type speed detecting means 6 and the output just before becomes larger than the reference value, as in the second embodiment, the output of the error amplifying means 10 may be made substantially zero or, as in the third embodiment, the output of the speed detecting means 6 may be replaced with the output of the speed instructing device 9.

The other operations and effects are the same as in the fourth embodiment.

The present invention can be applied to an optical disk driving apparatus of any of a solely reproducing type, additionally noting type and re-writing type.

As explained above, according to the present invention, there are effects that, even in case a pulse generated by a flaw or the like of the optical recording medium mixes into the track crossing pulse, the influence of the quick fluctuation of the speed detecting signal on the speed control of the light spot will be reduced and a stable accessing operation will be possible.

It is apparent that, in this invention, a wide range of working modes can be formed based on this invention without deviating from the spirit and scope of the invention. This invention is not restricted by its specific working modes except being limited by the appended claims.

What is claimed is:

1. An accessing apparatus used for an optical information recording and reproducing apparatus for at least one of recording and reproducing information on an optical recording medium by using a light spot, said accessing apparatus controls a speed of the light spot for a track on the optical recording medium and accesses the light spot on an object track of the optical recording medium, comprising:

a speed instructing means for outputting a speed instructing signal showing a moving speed of the light spot for the track when accessing the light spot on the object track of said optical recording medium;

a position detecting means for detecting a track error signal showing a position difference between the light spot and the track;

a speed detecting means for detecting a speed detecting signal, said speed detecting signal using said track error signal to indicate a relative speed between the light spot and the track;

an error amplifying means for outputting a speed error signal which is based on said speed instructing signal and said speed detecting signal;

a driving means for moving the light spot for the track based on said speed error signal of said error amplifying means to access the light spot on the object track by controlling the speed of the light spot; and an amplitude regulating means for detecting when said speed detecting signal from said speed detecting means exceeds a predetermined range and for regulating the speed detecting signal from said speed detecting means so that said speed detecting signal exceeding said predetermined range may not be used for speed control of the light spot by said driving means.

2. An accessing apparatus used for an optical information recording and reproducing apparatus for at least one of recording and reproducing information on an optical recording medium by using a light spot, said accessing apparatus controls a speed of the light spot for a track on the optical recording medium and accesses the light spot on an object track of the optical recording medium, comprising:

a speed instructing means for outputting a speed instructing signal showing the light spot on the object tract of said optical recording medium;

a position detecting means for detecting a track error signal showing a position difference between the light spot and the track;

a speed detecting means for detecting a speed detecting signal, said speed detecting signal using said track error signal to indicate a relative speed between the light spot and the track;

an error amplifying means for outputting a speed error signal which is based on said speed instructing signal and said speed detecting signal;

a driving means for moving the light spot for the track based on said speed error signal of said error amplifying means to access the light spot on the object track by controlling the speed of the light spot; and an amplitude regulating means for regulating a signal between said speed detecting means and said driving means so that said speed detecting signal may not be used for speed control of the light spot by said driving means when said speed detecting signal, which exceeds a predetermined range, is detected in said speed detecting means wherein said amplitude regulating means includes a means for limiting said speed error signal to be below a fixed value.

3. An accessing apparatus according to claim 1 wherein said amplitude means includes a comparing means for comparing said speed error signal with a reference value to detect that said speed error signal has exceeded said reference value in order to detect that said speed detecting signal has exceeded said predetermined range.

4. An accessing apparatus according to claim 3 wherein said amplitude regulating device further includes a switching means for transmitting to said driving means a fixed value instead of said speed error signal.

5. An accessing apparatus according to claim 4 wherein said fixed value is zero.

6. An accessing apparatus according to claim 1 wherein said amplitude regulating device includes a comparing means for comparing said speed instructing signal and said speed detecting signal with each other to detect that a difference between said speed instructing signal and said speed detecting signal has exceeded a reference value in order to detect that said speed detecting signal has exceeded said predetermined range.

7. An accessing apparatus according to claim 6 wherein said amplitude regulating device further includes a switching means for transmitting to said error amplifying means said speed instructing signal instead of said speed detecting signal when said comparing means detects that the difference between said speed instructing signal and said speed detecting signal has exceeded said reference value.

8. An accessing apparatus according to claim 6 wherein said amplitude regulating means further includes a memorizing means for storing said speed detecting signal for a predetermined time period and a switching means for transmitting to said error amplifying means the speed detecting signal stored in said memorizing means instead of a present speed detecting signal when said comparing means detects that the difference between said speed instructing signal and said speed detecting signal has exceeded said reference value.

9. An accessing apparatus according to claim 1 wherein said amplitude regulating means includes a memorizing means for storing said speed detecting signal for a predetermined time period and a comparing means for comparing a present speed detecting signal and a speed detecting signal stored in said memorizing means with each other to detect that a difference between the present speed detecting signal and the speed detecting signal stored in said memorizing means has exceeded the reference value in order to detect that said speed detecting signal has exceeded said predetermined range.

10. An accessing apparatus according to claim 9 wherein said amplitude regulating means further includes a switching means for transmitting to said error amplifying means the speed detecting signal stored in said memorizing means instead of the present speed detecting signal when said comparing means detects that the difference between the present speed detecting signal and the speed detecting signal stored in said memorizing means has exceeded said reference value.

11. An accessing apparatus according to claim 1 wherein said speed detecting means detects said speed detecting signal by measuring a period when said track error signal crosses a zero level.

12. An accessing apparatus according to claim 1 wherein said error amplifying means includes a means for amplifying a difference between said speed instructing signal and said speed detecting signal.

* * * * *